(12) United States Patent
Ozkaptan et al.

(10) Patent No.: US 12,101,745 B2
(45) Date of Patent: Sep. 24, 2024

(54) EXPLOITING A NON-TRANSMISSION-DESIGNATED INTERVAL IN A CYCLE OF A PROTOCOL

(71) Applicant: Toyota Motor Engineering & Manufacturing North America, Inc., Plano, TX (US)

(72) Inventors: Ceyhun D. Ozkaptan, Columbus, OH (US); Chang-Heng Wang, Cupertino, CA (US); Onur Altintas, Mountain View, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 580 days.

(21) Appl. No.: 17/406,684

(22) Filed: Aug. 19, 2021

(65) Prior Publication Data
US 2023/0059486 A1 Feb. 23, 2023

(51) Int. Cl.
| H04W 72/04 | (2023.01) |
| H04L 5/00 | (2006.01) |
| H04W 4/40 | (2018.01) |

(52) U.S. Cl.
CPC ........... *H04W 72/04* (2013.01); *H04L 5/0082* (2013.01); *H04W 4/40* (2018.02)

(58) Field of Classification Search
None
See application file for complete search history.

(56) References Cited

U.S. PATENT DOCUMENTS 10,098,175 B2  10/2018  Kremo et al.
11,304,042 B1 *  4/2022  Ramakrishnan ..... H04B 1/7143
(Continued)

FOREIGN PATENT DOCUMENTS

WO    2019166429 A1    9/2019

OTHER PUBLICATIONS

Han et al., "Automotive Radar and Communications Sharing of the 79-GHz Band," CarSys '16: Proceedings of the First ACM International Workshop on Smart, Autonomous, and Connected Vehicular Systems and Services, Oct. 2016, pp. 6-13.
(Continued)

*Primary Examiner* — Rebecca E Song
(74) *Attorney, Agent, or Firm* — Christopher G. Darrow; DARROW MUSTAFA PC

(57) ABSTRACT

A system for exploiting a non-transmission-designated interval in a cycle of a protocol can include a processor and a memory. The memory can store a retrieval module, an alternative transmission determination module, and a schedule module. The retrieval module can cause the processor to retrieve, by a specific node associated with a set of nodes in a network, information about the set. The information can include, for a node in the set, identifications of a frequency and a time slot of a transmission-designated interval in a cycle of the protocol. The alternative transmission determination module can cause the processor to determine, based on the information, an existence, in the set, of a non-transmission-designated interval that has a duration greater than a threshold duration. The schedule module can cause the processor to schedule, in response to the existence, the specific node to produce a transmission during the non-transmission-designated interval.

20 Claims, 9 Drawing Sheets

(56) References Cited

U.S. PATENT DOCUMENTS

| | | | | |
|---|---|---|---|---|
| 2013/0034004 | A1* | 2/2013 | Mannemala | H04W 52/0216 370/252 |
| 2017/0289910 | A1* | 10/2017 | Islam | H04W 52/0216 |
| 2021/0055374 | A1* | 2/2021 | Dokhanchi | G01S 7/006 |

OTHER PUBLICATIONS

Mir et al., "Continuous Neighbor Discovery Protocol in Wireless Ad Hoc Networks with Sectored-Antennas," 2015 IEEE 29th International Conference on Advanced Information Networking and Applications, 2015, pp. 54-61.

You Han, "Spectrum Expansion to Solve the Spectrum Scarcity Problem in Vehicular Networks," dissertation The Ohio State University, 2017, 190 pages.

Feng et al., "Joint Radar and Communication: A Survey," China Communications, vol. 17, No. 1, Jan. 2020, pp. 1-27.

Morelli et al., "Synchronization Techniques for Orthogonal Frequency Division Multiple Access (OFDMA): A Tutorial Review," Proceedings of the IEEE, vol. 95, No. 7, Jul. 2007, pp. 1394-1427.

Mazahir et al., "A Survey on Joint Communication-Radar Systems," frontiers in Communications and Networks, vol. 1, Article 619483, Feb. 25, 2021, pp. 1-16.

Unknown, "Vehicular ad hoc network," last accessed on Aug. 10, 2021, 8 pages, found at https://en.wikipedia.org/wiki/Vehicular_ad_hoc_network.

Amendment of Parts 2, 15, and 97 of the Commission's Rules to Permit Use of Radio Frequencies Above 40 GHz for New Radio Application, Federal Communications Commission, Washington, D.C. 20554, First report and order and second notice of proposed rule making, ET Docket No. 94-124, Dec. 15, 1995, 51 pages.

I. M. Kunert, "Project final report, MOSARIM: More safety for all by radar interference mitigation," 2012.

Uysal et al., "Mitigation of automotive radar interference," 2018 IEEE Radar Conference (RadarConf18), Oklahoma City, OK, USA, 2018, pp. 0405-0410.

Bechter et al., "Automotive radar interference mitigation by reconstruction and cancellation of interference component," 2015 IEEE MTT-S International Conference on Microwaves for Intelligent Mobility (ICMIM), Heidelberg, Germany, 2015, pp. 1-4.

* cited by examiner

| Vehicle Identification | Transceiver Identification | Frequency | Time Slot | Timestamp |
|---|---|---|---|---|
| Second Vehicle 212 | Back Transceiver 234 | Second Sub-Band 114 | $t_{12}$ | 2107251003 |
| First Vehicle 210 | Front Transceiver 218 | First Sub-Band 112 | $t_4$ | 2107251001 |

FIG. 4

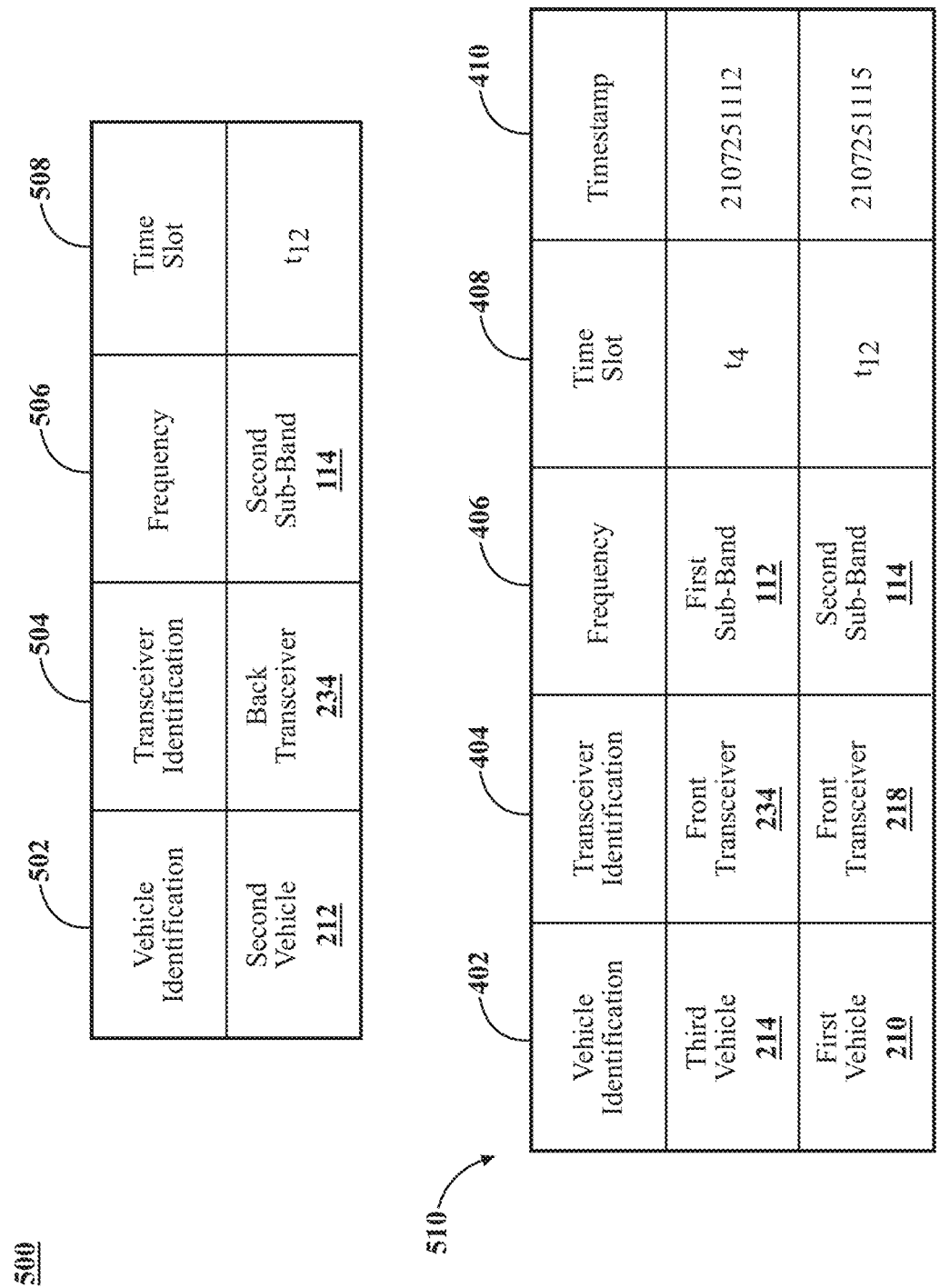

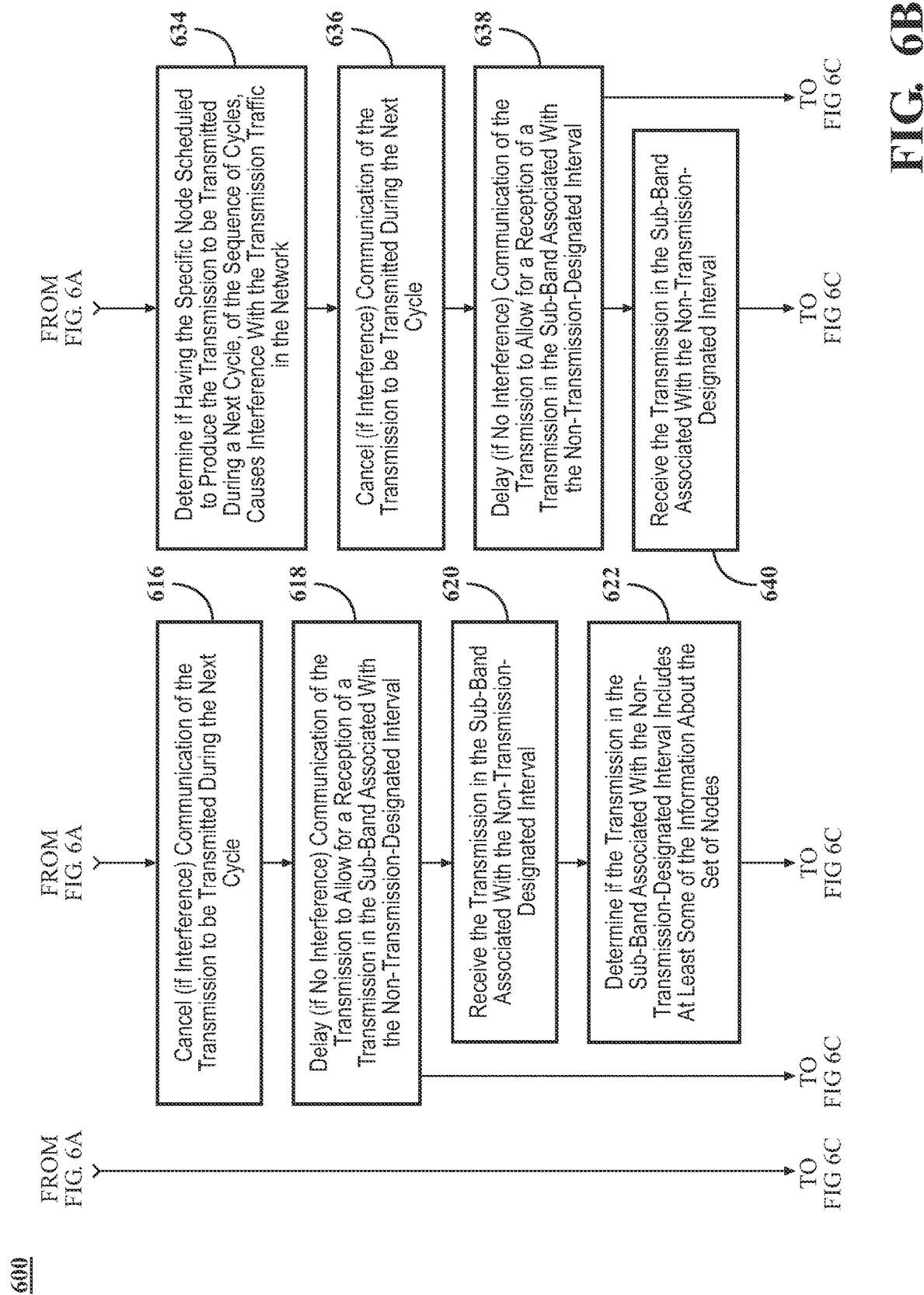

EXPLOITING A NON-TRANSMISSION-DESIGNATED INTERVAL IN A CYCLE OF A PROTOCOL

TECHNICAL FIELD

The disclosed technologies are directed to exploiting a non-transmission-designated interval in a cycle of a protocol.

BACKGROUND

Historically, operation of a vehicle in a manner that avoids a collision with another object has depended upon the efficacies of the senses of an operator of the vehicle. In the past few decades, technologies have been developed to assist or supersede reliance upon the senses of the operator. Such technologies can include, for example, sensors disposed on the vehicle, "connected car" technologies, driving automation technologies, or the like.

Sensors disposed on the vehicle can include, for example, one or more of global navigation satellite systems (GNNS), inertial measurement units (IMU), image sensors, cameras, radar systems, light detection and ranging (LIDAR) systems, ultrasonic systems, or the like.

"Connected car" technologies can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

SUMMARY

In an embodiment, a system for exploiting a non-transmission-designated interval in a cycle of a protocol can include a processor and a memory. The memory can store a retrieval module, an alternative transmission determination module, and a schedule module. The retrieval module can include instructions that when executed by the processor cause the processor to retrieve, by a specific node associated with a set of nodes in a network, information about the set. The information can include, for a node in the set, identifications of a frequency and a time slot of a transmission-designated interval in a cycle of the protocol. The alternative transmission determination module can include instructions that when executed by the processor cause the processor to determine, based on the information, an existence, in the set, of a non-transmission-designated interval that has a duration greater than a threshold duration. The schedule module can include instructions that when executed by the processor cause the processor to schedule, in response to the existence, the specific node to produce a transmission during the non-transmission-designated interval.

In another embodiment, a method for exploiting a non-transmission-designated interval in a cycle of a protocol can include retrieving, by a processor of a specific node associated with a set of nodes in a network, information about the set. The information can include, for a node in the set, identifications of a frequency and a time slot of a transmission-designated interval in a cycle of the protocol. The method can also include determining, by the processor and based on the information, an existence, in the set, of a non-transmission-designated interval that has a duration greater than a threshold duration. The method can also include scheduling, by the processor and in response to the existence, the specific node to produce a transmission during the non-transmission-designated interval.

In another embodiment, a non-transitory computer-readable medium for exploiting a non-transmission-designated interval in a cycle of a protocol can include instructions that when executed by one or more processors cause the one or more processors to retrieve, by a specific node associated with a set of nodes in a network, information about the set. The information can include, for a node in the set, identifications of a frequency and a time slot of a transmission-designated interval in the cycle of the protocol. The non-transitory computer-readable medium can also include instructions that when executed by the one or more processors cause the one or more processors to determine, based on the information, an existence, in the set, of a non-transmission-designated interval that has a duration greater than a threshold duration. The non-transitory computer-readable medium can also include instructions that when executed by the one or more processors cause the one or more processors to schedule, in response to the existence, the specific node to produce a transmission during the non-transmission-designated interval.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 4 includes a diagram that illustrates an example of a neighbor table, according to the disclosed technologies.

FIG. 5 includes a diagram that illustrates an example of a beacon message with an attached neighbor table, according to the disclosed technologies.

FIGS. 6A-6C are a flow diagram that illustrates an example of a method that is associated with exploiting a non-transmission-designated interval in a cycle of a protocol, according to the disclosed technologies.

DETAILED DESCRIPTION

Figure 1:
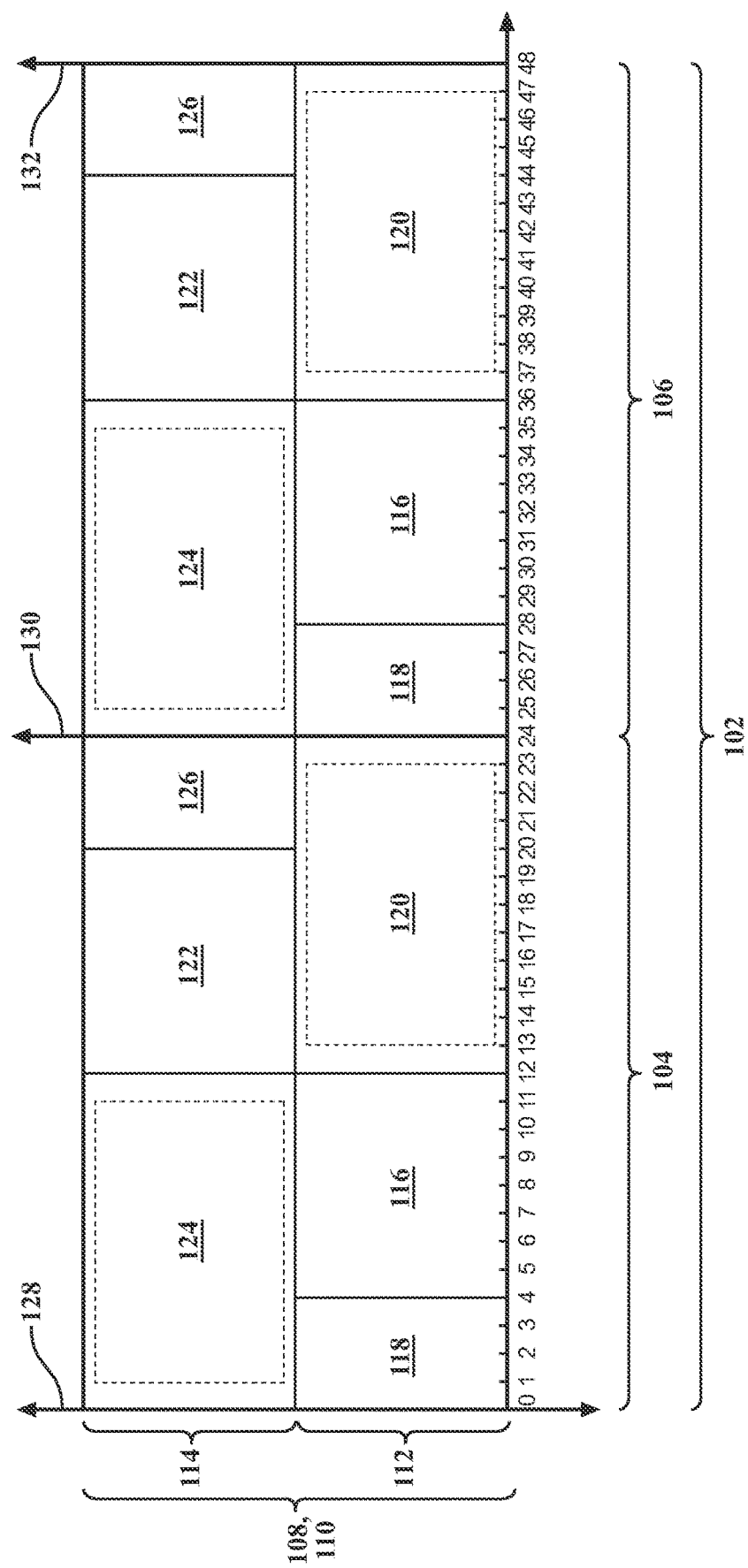
FIG. 1 includes a diagram that illustrates an example of a sequence of cycles of a protocol, according to the disclosed technologies.

Radar systems can be used by a vehicle to determine one or more of a range to another object, a speed of the other object, or a direction of the other object. Such an ability can be particularly advantageous for an operator of the vehicle in a condition of poor visibility, when the other object is located in a blind spot of the operator, or the like. Additionally, radar systems can be used in a variety of applications of driving automation technologies. To facilitate such developments, on Dec. 15, 1995, the Federal Communications Commission (FCC) issue an order that allocated the 77 GHz frequency band for vehicular radar systems on an unlicensed basis.

"Vehicle to Vehicle" technology can be used to form a vehicular ad hoc network (VANET) based on the principles of mobile ad hoc networks for the spontaneous formation of a wireless network of mobile devices. A vehicular ad hoc network can be used for a variety of applications including transmission of cooperative awareness messages (CAMs), electronic brake light communications (which communicate a braking action of a vehicle), platooning (in which vehicles move together in coordination with a short distance of separation between the vehicles), communicating traffic information, On-the-Road services (in which communication of an advertisement occurs when a vehicle is near to a subject of the advertisement), or the like. To manage communications in vehicular ad hoc networks, on Jul. 15, 2010, the Institute of Electrical and Electronics Engineers (IEEE) published the 1609 Wireless Access in Vehicular Environments (WAVE) protocol, which reserved seven channels in the 5.9 GHz frequency band for use for vehicular ad hoc networks.

The development of applications for vehicular radar systems and "connected car" technologies and the incorporation of these technologies in an increasing number of vehicles have given cause for concern about a high degree of transmission traffic in the 5.9 GHz frequency band and the 77 GHz frequency band. To address this concern, joint automotive radar-communication (JARC) strategies are being implemented in which a transceiver can be used for simultaneous wireless communication and automotive radar sensing via a single radio-frequency transmission. In this manner, the transceiver can transmit data while performing radar sensing. Because the bandwidth allocated for automotive radar systems (e.g., 4 GHZ) is larger than the bandwidth allocated for vehicular ad hoc networks, implementations of joint automotive radar-communication strategies have been in the 77 GHz frequency band.

The disclosed technologies are directed to exploiting a non-transmission-designated interval in cycle of a protocol. For example, the protocol can be a medium access protocol. A medium access protocol can define rules that provide for an orderly access to a shared medium by a set of nodes in a network. In this manner, a medium access protocol can cause one or more of efficient or fair sharing of scarce wireless bandwidth. For example, the network can be associated with a channel. For example, the channel can have one or more sub-bands. For a sub-band, a cycle of the protocol can include a transmission-designated interval and one or more non-transmission-designated intervals. For example, the one or more non-transmission-designated intervals can include a non-transmission-designated interval that occurs, in the cycle, before the transmission-designated interval. Such a non-transmission-designated interval can be referred to as a "wait" interval. For example, the one or more non-transmission-designated intervals can include a non-transmission-designated interval that occurs, in the cycle, after the transmission-designated interval. Such a non-transmission-designated interval can be referred to as an "idle" interval.

A specific node, associated with a set of nodes in the network, can retrieve information about the set of nodes. For example, the specific node can be disposed on a vehicle. For example, the specific node can be an element of the set of nodes. Alternatively, for example, the specific node can be a candidate to join the set of nodes. The information can include, for a node in the set, identifications of a frequency (e.g., a sub-band) and a time slot of the transmission-designated interval in the cycle. For example, the information can be stored in a data store in an arrangement that can be referred to as a "neighbor table". For example, a least some of the information can be received by the specific node, via a transceiver, from one or more other nodes in the set. For example, a transmission that includes such information can be referred to as a "beacon message". The specific node can determine, based on the information, an existence, in the set of nodes, of a non-transmission-designated interval that has a duration greater than a threshold duration. For example, the channel can be used for both a communications operation and a radar operation. For example, the threshold duration can allow a transmission to have a sufficient amount of energy for the radar operation. The specific node can schedule, in response to the existence of a non-transmission-designated interval that has a duration greater than the threshold duration, the specific node to produce the transmission during the non-transmission-designated interval. In this manner, a greater degree of transmission traffic can be communicated through the channel.

FIG. 1 includes a diagram that illustrates an example of a sequence of cycles 102 of a protocol, according to the disclosed technologies. The sequence of cycles 102 can include, for example, a first cycle 104 and a second cycle 106. The protocol can be used, for example, by a set of nodes in a network. For example, the network can be associated with a channel 108. For example, the channel 108 can have one or more sub-bands 110. The one or more sub-bands 110 can include, for example, a first sub-band 112 and a second sub-band 114.

For example, for the first sub-band 112, each of the cycles 102 of the protocol can include a transmission-designated interval 116 and one or more non-transmission-designated intervals 118 and 120. For example, the one or more non-transmission-designated intervals 118 and 120 can include a non-transmission-designated interval 118 that occurs, in each of the cycles 102, before the transmission-designated interval 116. The non-transmission-designated interval 118 can be referred to as a "wait" interval. For example, the one or more non-transmission-designated intervals 118 and 120 can include a non-transmission-designated interval that occurs, in each of the cycles 102, after the transmission-designated interval 116. The non-transmission-designated interval 120 can be referred to as an "idle" interval. For example, for the first sub-band 112, for the first cycle 104, the non-transmission-designated interval 118 can be from $t_0$ to $t_4$, the transmission-designated interval 116 can be from $t_4$ to $t_{12}$, and the non-transmission-designated interval 120 can be from $t_{12}$ to $t_{24}$. For example, for the first sub-band 112, for the second cycle 106, the non-transmission-designated interval 118 can be from $t_{24}$ to $t_{28}$, the transmission-designated interval 116 can be from $t_{28}$ to $t_{36}$, and the non-transmission-designated interval 120 can be from $t_{36}$ to $t_{48}$.

For example, for the second sub-band 114, each of the cycles 102 of the protocol can include a transmission-designated interval 122 and one or more non-transmission-designated intervals 124 and 126. For example, the one or more non-transmission-designated intervals 124 and 126 can include a non-transmission-designated interval 124 that occurs, in each of the cycles 102, before the transmission-designated interval 122. The non-transmission-designated interval 124 can be referred to as a "wait" interval. For example, the one or more non-transmission-designated intervals 124 and 126 can include a non-transmission-designated interval 126 that occurs, in each of the cycles 102, after the transmission-designated interval 122. The non-transmission-designated interval 126 can be referred to as an "idle" interval. For example, for the second sub-band 114, for the first cycle 104, the non-transmission-designated interval 124 can be from $t_0$ to $t_{12}$, the transmission-designated interval 122 can be from $t_{12}$ to $t_{20}$, and the non-transmission-designated interval 126 can be from $t_{20}$ to $t_{24}$. For example, for the second sub-band 114, for the second cycle 106, the non-transmission-designated interval 124 can be from $t_{24}$ to $t_{36}$, the transmission-designated interval 122 can be from $t_{36}$ to $t_{44}$, and the non-transmission-designated interval 126 can be from $t_{44}$ to $t_{48}$.

Figure 2:
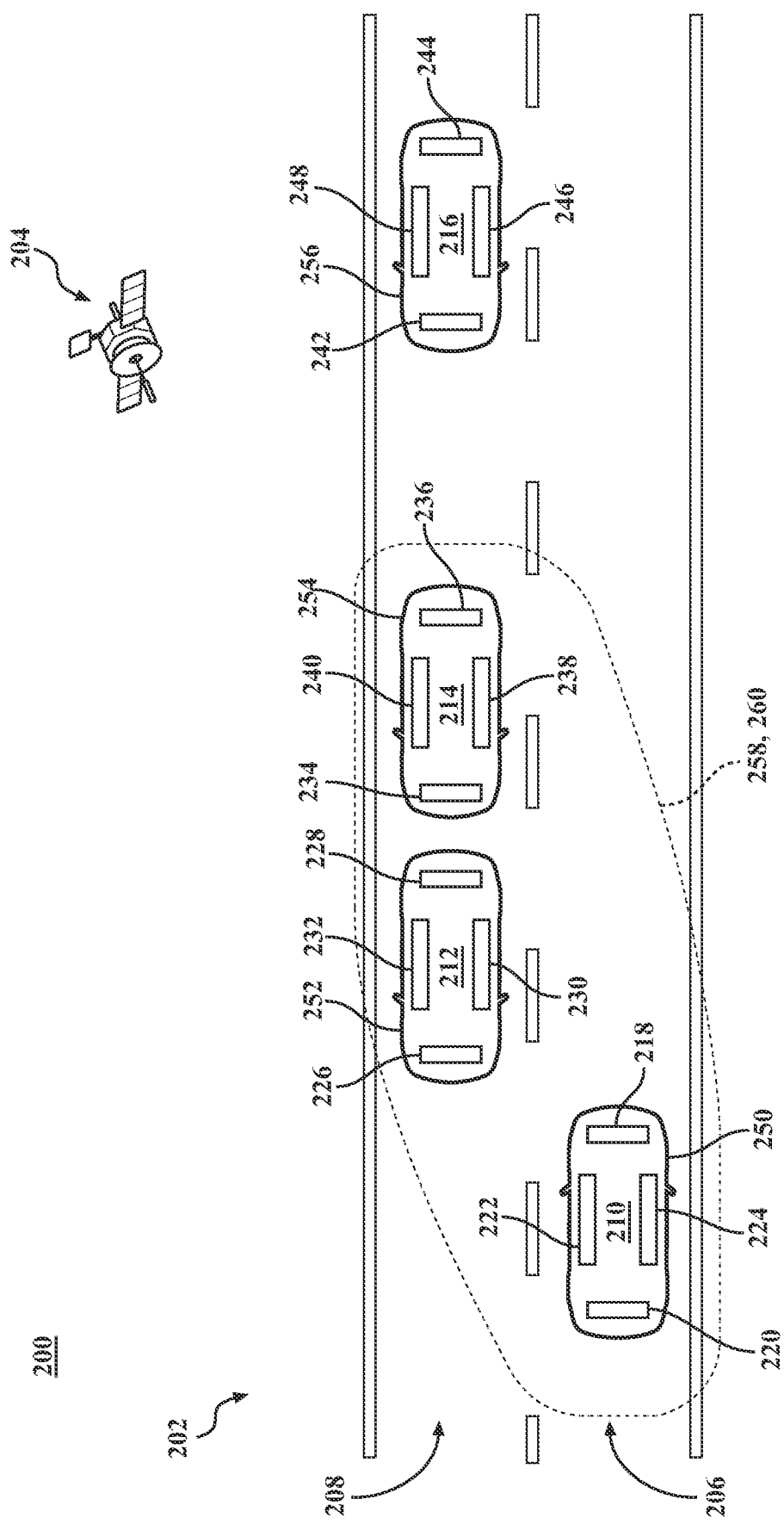
FIG. 2 includes a diagram that illustrates an example of an environment for communicating according to the protocol, according to the disclosed technologies.

FIG. 2 includes a diagram that illustrates an example of an environment 200 for communicating according to the protocol, according to the disclosed technologies. The environment 200 can include, for example, a road 202 and a global navigation satellite system (GNNS) 204. For example, the road 202 can include a first lane 206 and a second lane 208. Located in the first lane 206 can be, for example, a first vehicle 210. Located in the second lane 208 can be, for example, a second vehicle 212, a third vehicle 214, and a fourth vehicle 216. The first vehicle 210 can include, for example, a front transceiver 218, a back transceiver 220, a left transceiver 222, and a right transceiver 224. The second vehicle 212 can include, for example, a front transceiver 226, a back transceiver 228, a left transceiver 230, and a right transceiver 232. The third vehicle 214 can include, for example, a front transceiver 234, a back transceiver 236, a left transceiver 238, and a right transceiver 240. The fourth vehicle 216 can include, for example, a front transceiver 242, a back transceiver 244, a left transceiver 246, and a right transceiver 248. For example, the first vehicle 210 can be a first node 250, the second vehicle 212 can be a second node 252, the third vehicle 214 can be a third node 254, and the fourth vehicle 216 can be a fourth node 256. For example, the first node 250, the second node 252, and the third node 254 can be a set 258 of nodes in a network 260.

With reference to FIGS. 1 and 2, for example, an endpoint of each of the cycles 102 can be designated by a synchronization signal. For example, endpoints of the sequence of cycles 102 can be designated by a first synchronization signal 128, a second synchronization signal 130, and a third synchronization signal 132. One or more of the first synchronization signal 128, the second synchronization signal 130, or the third synchronization signal 132 can be produced by one or more of the global navigation satellite system 204 or a synchronization control node in the network 260. Any node in the set 258 of nodes can be the synchronization control node. Additionally or alternatively, an endpoint of each of the cycles 102 can be designated by a pattern in each of the cycles 102 agreed-upon by otherwise synchronized nodes in the network 260. For example, for the first sub-band 112, the pattern in the first cycle 104 (e.g., the non-transmission-designated interval 118 being from $t_0$ to $t_4$, the transmission-designated interval 116 being be from $t_4$ to $t_{12}$, and the non-transmission-designated interval 120 being from $t_{12}$ to $t_{24}$) can be the same as the pattern in the second cycle 106 (e.g., the non-transmission-designated interval 118 being from $t_{24}$ to $t_{28}$, the transmission-designated inter- val 116 being from $t_{28}$ to $t_{36}$, and the non-transmission-designated interval 120 being from $t_{36}$ to $t_{48}$).

Figure 3:
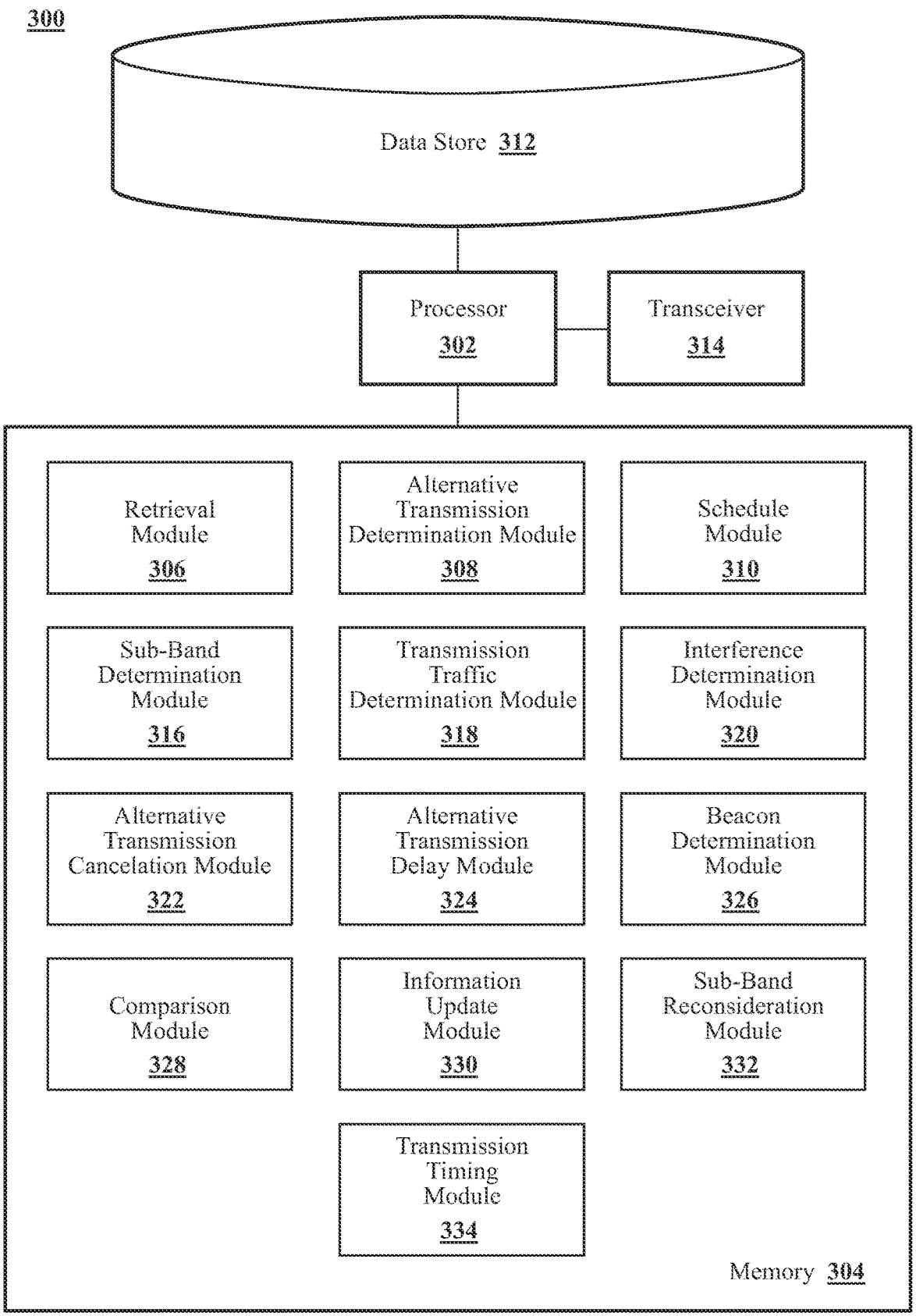
FIG. 3 includes a block diagram that illustrates an example of a system for exploiting a non-transmission-designated interval in a cycle of a protocol, according to the disclosed technologies.

FIG. 3 includes a block diagram that illustrates an example of a system 300 for exploiting a non-transmission-designated interval in a cycle of a protocol, according to the disclosed technologies. For example, the protocol can be a medium access protocol. The system 300 can include, for example, a processor 302 and a memory 304. The memory 304 can be communicably coupled to the processor 302. The memory 304 can store a retrieval module 306, an alternative transmission determination module 308, and a schedule module 310.

The retrieval module 306 can include instructions that function to control the processor 302 to retrieve, by a specific node associated with a set of nodes in a network, information about the set of nodes. For example, the specific node can be disposed on a vehicle. The information can include, for a node in the set, identifications of a frequency and a time slot of a transmission-designated interval in a cycle of the protocol.

For example, the specific node can be an element of the set of nodes. With reference to FIG. 2, for example, the specific node can be the third node 254 (e.g., the third vehicle 214), which is an element of the set 258 of nodes.

Alternatively, for example, the specific node can be a candidate to join the set of nodes. For example, the specific node can be the fourth node 256 (e.g., the fourth vehicle 216), which is a candidate to join the set 258 of nodes.

Returning to FIG. 3, for example, the system 300 can further include a data store 312. The data store 312 can be communicably coupled to the processor 302. The data store 312 can be configured to store the information. For example, the information can be stored in an arrangement that can be referred to as a "neighbor table". For example, the instructions to retrieve can include instructions to retrieve, from the data store 312, the information.

FIG. 4 includes a diagram that illustrates an example of a neighbor table 400, according to the disclosed technologies. With reference to FIGS. 1, 2, and 4, for example, the specific node that has the neighbor table 400 can be the third node 254 (e.g., the third vehicle 214). For example, the neighbor table 400 can include fields for a vehicle identification 402, a transceiver identification 404, a frequency 406, a time slot 408, and a timestamp 410. The network 260 can be associated with the channel 108. The frequency 406 can be associated with a sub-band of the channel 108. The time slot 408 can be a time, in one of the cycles 102, at which the transmission-designated interval 116 commences. For example, neighbor table 400 can include records 412. For example, the records 412 can include a first record 414 and a second record 416. For example, the first record 414 can be for the first node 250 (e.g., the first vehicle 210). For example, the second record 416 can be for the second node 252 (e.g., the second vehicle 213). The timestamp 410 can be a time for a most recent entry into a record of the neighbor table 400.

Returning to FIG. 3, for example, the system 300 can further include a transceiver 314. The transceiver 314 can be communicably coupled to the processor 302. The transceiver 314 can be configured to receive, from one or more other nodes in the set, at least some of the information. For example, a transmission that includes such information can be referred to as a "beacon message".

FIG. 5 includes a diagram that illustrates an example of a beacon message 500 with an attached neighbor table 510, according to the disclosed technologies. With reference to FIGS. 1, 2, and 5, for example, the specific node that receives the beacon message 500 can be the third node 254 (e.g., the third vehicle 214). For example, the node in the set 258 that transmits the beacon message 500 can be the second node 252 (e.g., the second vehicle 212). For example, the beacon message 500 can include a vehicle identification 502, a transceiver identification 504, a frequency 506, a time slot 508, and the neighbor table 510. The vehicle identification 502 can be for the second vehicle 212. The transceiver identification 504 can be for the transceiver 228 (disposed on the second vehicle 212) that transmitted the beacon message 500. The network 260 can be associated with the channel 108. The frequency 506 can be associated with a sub-band, of the channel 108, at which the beacon message 500 was transmitted. The time slot 508 can be a time, in one of the cycles 102, at which the transmission of the beacon message 500 commenced. The neighbor table 510 can be a neighbor table for the second node 252 (e.g., the second vehicle 212).

Returning to FIG. 3, the alternative transmission determination module 308 can include instructions that function to control the processor 302 to determine, based on the information, an existence, in the set of nodes, of a non-transmission-designated interval that has a duration greater than a threshold duration.

In a configuration: (1) the network can be associated with a channel and (2) the channel can be used for both a communications operation and a radar operation. Additionally, for example, the threshold duration can allow the transmission to have a sufficient amount of energy for the radar operation.

With reference to FIG. 1, for example: (1) for the first sub-band 112: (a) if the threshold duration is from $t_{13}$ to $t_{23}$, then the non-transmission-designated interval 120 (from $t_{12}$ to $t_{24}$) can be a non-transmission-designated interval that has a duration greater than the threshold duration and (b) if the threshold duration is from $t_{37}$ to $t_{47}$, then the non-transmission-designated interval 120 (from $t_{36}$ to $t_{48}$) can be a non-transmission-designated interval that has a duration greater than the threshold duration and (2) for the second sub-band 114: (a) if the threshold duration is from $t_1$ to $t_{11}$, then the non-transmission-designated interval 124 (from $t_0$ to $t_{12}$) can be a non-transmission-designated interval that has a duration greater than the threshold duration and (b) if the threshold duration is from $t_{25}$ to $t_{35}$, then the non-transmission-designated interval 124 (from $t_{24}$ to $t_{36}$) can be a non-transmission-designated interval that has a duration greater than the threshold duration.

Returning to FIG. 3, the schedule module 310 can include instructions that function to control the processor 302 to schedule, in response to the existence of a non-transmission-designated interval that has a duration greater than the threshold duration, the specific node to produce a transmission during the non-transmission-designated interval.

For example, the network can be associated with a channel. A frequency of the specific node can be within a sub-band of the channel. The non-transmission-designated interval of the specific node can be within the sub-band. With reference to FIGS. 1 and 2, for example, the network 260 can be associated with the channel 108. The specific node can be the third node 254 (e.g., the third vehicle 214). The frequency of the third node 254 can be within the first sub-band 112 of the channel 108. The non-transmission-designated interval 120 of the third node 254 can be within the first sub-band 112.

Alternatively, for example, the network can be associated with a channel. A frequency of the specific node can be within a first sub-band of the channel. The non-transmission-designated interval of the specific node can be within a second sub-band of the channel. For example, the network 260 can be associated with the channel 108. The specific node can be the third node 254 (e.g., the third vehicle 214). The frequency of the third node 254 can be within the first sub-band 112 of the channel 108. The non-transmission-designated interval 118 of the third node 254 can be within the second sub-band 114 of the channel 108.

For example, the non-transmission-designated interval can occur, in the cycle, before the transmission-designated interval (e.g., a "wait" interval).

Returning to FIG. 3, for example, the network can be associated with a channel. A frequency of the specific node can be within a specific sub-band of the channel. The memory 304 can further store a sub-band determination module 316. The sub-band determination module 316 can include instructions that function to control the processor 302 to determine, in response to the existence of a non-transmission-designated interval that has a duration greater than the threshold duration, a sub-band, of the channel, associated with the non-transmission-designated interval. The instructions to schedule can include instructions to schedule, in response to the sub-band associated with the non-transmission-designated interval being the specific sub-band, the specific node to produce the transmission to be transmitted during a current cycle of a sequence of cycles. The instructions to schedule can include instructions to schedule, in response to the sub-band associated with the non-transmission-designated interval being different from the specific sub-band, the specific node to produce the transmission to be transmitted during a next cycle of the sequence of cycles.

With reference to FIGS. 1 and 2, for example, the network 260 can be associated with the channel 108. The specific node can be the third node 254 (e.g., the third vehicle 214). The frequency of the third node 254 can be within the first sub-band 112 of the channel 108. The current cycle of the sequence of cycles can be the first cycle 104 of the sequence of cycles 102. The next cycle of the sequence of cycles can be the second cycle 106 of the sequence of cycles 102. If the instructions to determine the sub-band associated with the non-transmission-designated interval determine that the sub-band associated with the non-transmission-designated interval 120 is the first sub-band 112, then the instructions to schedule can schedule the third node 254 to produce the transmission to be transmitted during the first cycle 104. If the instructions to determine the sub-band associated with the non-transmission-designated interval determine that the sub-band associated with the non-transmission-designated interval 120 is the second sub-band 114, then the instructions to schedule can schedule the third node 254 to produce the transmission to be transmitted during the second cycle 106.

Returning to FIG. 3, for example, the memory 304 can further store a transmission traffic determination module 318, an interference determination module 320, an alternative transmission cancelation module 322, and an alternative transmission delay module 324. The transmission traffic determination module 318 can include instructions that function to control the processor 302 to determine, in response to the sub-band associated with the non-transmission-designated interval being different from the specific sub-band, if a degree of a transmission traffic in the network is greater than a threshold degree. The interference determination module 320 can include instructions that function to control the processor 302 to determine, in response to a determination that the degree of the transmission traffic in the network is greater than the threshold degree, if having the specific node scheduled to produce the transmission to be transmitted during the next cycle causes interference with the transmission traffic in the network. The alternative transmission cancelation module 322 can include instructions that function to control the processor 302 to cancel, in response to a determination that having the specific node scheduled to produce the transmission to be transmitted during the next cycle causes interference with the transmission traffic in the network, communication of the transmission to be transmitted during the next cycle. The alternative transmission delay module 324 can include instructions that function to control the processor 302 to delay, in response to a determination that having the specific node scheduled to produce the transmission to be transmitted during the next cycle does not cause interference with the transmission traffic in the network, communication of the transmission to allow for reception of a transmission in the sub-band associated with the non-transmission-designated interval.

With reference to FIGS. 1 and 2, for example, in response to the sub-band associated with the non-transmission-designated interval 120 being the second sub-band 114, the instructions to determine if the degree of the transmission traffic in the network is greater than the threshold degree can determine that the degree of the transmission traffic in the network 260 is greater than the threshold degree. In response to the determination that the degree of the transmission traffic in the network 260 is greater than the threshold degree, the instructions to determine if having the specific node scheduled to produce the transmission to be transmitted during the next cycle causes interference with the transmission traffic in the network can determine if having the third node 254 (e.g., the third vehicle 214) scheduled to produce the transmission to be transmitted during the second cycle 106 causes interference with the transmission traffic in the network 260. In response to the determination that having the third node 254 scheduled to produce the transmission to be transmitted during the second cycle 106 causes interference with the transmission traffic in the network 260, the instructions to cancel communication of the transmission to be transmitted during the next cycle can cancel communication of the transmission to be transmitted during the second cycle 106. In response to the determination that having the third node 254 scheduled to produce the transmission to be transmitted during the second cycle 106 does not cause interference with the transmission traffic in the network 260, the instructions to delay communication of the transmission to allow for reception of a transmission in the sub-band associated with the non-transmission-designated interval can delay communication of the transmission to allow for reception of a transmission in the second sub-band 114.

Returning to FIG. 3, for example, the system 300 can further include the transceiver 314 and the data store 312. The transceiver 314 can be communicably coupled to the processor 302. The transceiver 314 can be configured to receive the transmission in the sub-band associated with the non-transmission-designated interval. The data store 312 can be communicably coupled to the processor 302. The data store 312 can be configured to store the information. The memory 304 can further store a beacon determination module 326, a comparison module 328, and an information update module 330. The beacon determination module 326 can include instructions that function to control the processor 302 to determine if the transmission in the sub-band associated with the non-transmission-designated interval includes at least some of the information about the set of nodes. The comparison module 328 can include instructions that function to control the processor 302 to compare, in response to a determination that the transmission in the sub-band associated with the non-transmission-designated interval does include the at least some of the information, a timestamp of an item in the at least some of the information with a timestamp of a corresponding item in a data store. The information update module 330 can include instructions that function to control the processor 302 to update, in response to a result of a comparison between the timestamp of the item in the at least some of the information and the timestamp of the corresponding item in the data store being that the timestamp of the item in the at least some of the information is associated with a later time than the timestamp of the corresponding item in the data store, the corresponding item in the data store to be replaced by the item in the at least some of the information.

With reference to FIGS. 1-5, for example, the transceiver 314 can receive the transmission in the second sub-band 114. The data store 312 can store the information. For example, the information can be stored in the neighbor table 400. The instructions to determine if the transmission in the sub-band associated with the non-transmission-designated interval includes the at least some of the information about the set of nodes can determine that the transmission in the second sub-band 114 includes the at least some of the information about the set 258 of nodes. For example, the transmission can be the beacon message 500. In response to the determination that the transmission in the second sub-band 114 does include the at least some of the information, the instructions to compare the timestamp of the item in the at least some of the information with the timestamp of the corresponding item in the data store can compare the timestamp 410 of a record for the first node 250 (e.g., the first vehicle 210) in the neighbor table 510 of the beacon message 500 with the timestamp 410 of the record 414 for the first node 250 in the neighbor table 400. In response to the result of the comparison between the timestamp 410 of the record for the first node 250 in the neighbor table 510 of the beacon message 500 with the timestamp 410 of the record 414 for the first node 250 in the neighbor table 400 being that the timestamp 410 of the record for the first node 250 in the neighbor table 510 of the beacon message 500 is associated with a later time than the timestamp 410 of the record 414 for the first node 250 in the neighbor table 400, the instructions to update the corresponding item in the data store can update the record 414 for the first node 250 in the neighbor table 400 to be replaced by the record for the first node 250 in the neighbor table 510 of the beacon message 500.

Returning to FIG. 3, for example, the memory 304 can further store a sub-band reconsideration module 332. The sub-band reconsideration module 332 can include instructions that function to control the processor 302 to determine, based on the item in the at least some of the information, if the frequency of the specific node needs to be changed to be within a sub-band, of the channel, different from the specific sub-band.

With reference to FIGS. 1, 2, 4, and 5, for example, the instructions to determine, based on the item in the at least some of the information, if the frequency of the specific node needs to be changed to be within a sub-band, of the channel, different from the specific sub-band can determine, based on the record for the first node 250 in the neighbor table 510 of the beacon message 500 including information that the frequency 406 of the first node 250 (e.g., the first vehicle 210) is associated with the second sub-band 114, that the frequency of the third node 254 (e.g., the third vehicle 214) needs to be changed to be within a sub-band, of the channel 108, different from the second sub-band 114.

For example, the non-transmission-designated interval can occur, in the cycle, after the transmission-designated interval (e.g., an "idle" interval).

Returning to FIG. 3, for example, the network can be associated with a channel. The memory 304 can further store an alternative transmission timing module 334, the transmission traffic determination module 318, the interference determination module 320, the alternative transmission cancelation module 322, and the alternative transmission delay module 324. The alternative transmission timing module 334 can include instructions that function to control the processor 302 to determine if the specific node is scheduled to produce the transmission to be transmitted during a current cycle of a sequence of cycles. The transmission traffic determination module 318 can include instructions that function to control the processor 302 to determine, in response to a determination that the specific node is not scheduled to produce the transmission to be transmitted during the current cycle, if a degree of a transmission traffic in the network is greater than a threshold degree. The interference determination module 320 can include instructions that function to control the processor 302 to determine, in response to a determination that the degree of the transmission traffic in the network is greater than the threshold degree, if having the specific node scheduled to produce the transmission to be transmitted during a next cycle, of the sequence of cycles, causes interference with the transmission traffic in the network. The alternative transmission cancelation module 322 can include instructions that function to control the processor 302 to cancel, in response to a determination that having the specific node scheduled to produce the transmission to be transmitted during the next cycle causes interference with the transmission traffic in the network, communication of the transmission to be transmitted during the next cycle. The alternative transmission delay module 324 can include instructions that function to control the processor 302 to delay, in response to a determination that having the specific node scheduled to produce the transmission to be transmitted during the next cycle does not cause interference with the transmission traffic in the network, communication of the transmission to allow for reception of a transmission in the sub-band associated with the non-transmission-designated interval.

With reference to FIGS. 1 and 2, for example, the current cycle of the sequence of cycles can be the first cycle 104 of the sequence of cycles 102. The next cycle of the sequence of cycles can be the second cycle 106 of the sequence of cycles 102. The instructions to determine if the specific node is scheduled to produce the transmission to be transmitted during the current cycle of the sequence of cycles can determine if the third node 254 (e.g., the third vehicle 214) is scheduled to produce the transmission to be transmitted during the first cycle 104. In response to the determination that the third node 254 is not scheduled to produce the transmission to be transmitted during the first cycle 104, the instructions to determine if the degree of the transmission traffic in the network is greater than the threshold degree can determine that the degree of the transmission traffic in the network 260 is greater than the threshold degree. In response to the determination that the degree of the transmission traffic in the network 260 is greater than the threshold degree, the instructions to determine if having the specific node scheduled to produce the transmission to be transmitted during the next cycle causes interference with the transmission traffic in the network can determine if having the third node 254 scheduled to produce the transmission to be transmitted during the second cycle 106 causes interference with the transmission traffic in the network 260. In response to the determination that having the third node 254 scheduled to produce the transmission to be transmitted during the second cycle 106 causes interference with the transmission traffic in the network 260, the instructions to cancel communication of the transmission to be transmitted during the next cycle can cancel communication of the transmission to be transmitted during the second cycle 106. In response to the determination that having the third node 254 scheduled to produce the transmission to be transmitted during the second cycle 106 does not cause interference with the transmission traffic in the network 260, the instructions to delay communication of the transmission to allow for reception of a transmission in the sub-band associated with the non-transmission-designated interval can delay communication of the transmission to allow for reception of a transmission in the second sub-band 114.

Returning to FIG. 3, for example, the system 300 can further include the transceiver 314 and the data store 312. The transceiver 314 can be communicably coupled to the processor 302. The transceiver 314 can be configured to receive the transmission in the sub-band associated with the non-transmission-designated interval. The data store 312 can be communicably coupled to the processor 302. The data store 312 can be configured to store the information. The memory 304 can further store the beacon determination module 326, the comparison module 328, and the information update module 330. The beacon determination module 326 can include instructions that function to control the processor 302 to determine if the transmission in the sub-band associated with the non-transmission-designated interval includes at least some of the information about the set of nodes. The comparison module 328 can include instructions that function to control the processor 302 to compare, in response to a determination that the transmission in the sub-band associated with the non-transmission-designated interval does include the at least some of the information, a timestamp of an item in the at least some of the information with a timestamp of a corresponding item in a data store. The information update module 330 can include instructions that function to control the processor 302 to update, in response to a result of a comparison between the timestamp of the item in the at least some of the information and the timestamp of the corresponding item in the data store being that the timestamp of the item in the at least some of the information is associated with a later time than the timestamp of the corresponding item in the data store, the corresponding item in the data store to be replaced by the item in the at least some of the information.

With reference to FIGS. 1-5, for example, the transceiver 314 can receive the transmission in the second sub-band 114. The data store 312 can store the information. For example, the information can be stored in the neighbor table 400. The instructions to determine if the transmission in the sub-band associated with the non-transmission-designated interval includes the at least some of the information about the set of nodes can determine that the transmission in the second sub-band 114 includes the at least some of the information about the set 258 of nodes. For example, the transmission can be the beacon message 500. In response to the determination that the transmission in the second sub-band 114 does include the at least some of the information, the instructions to compare the timestamp of the item in the at least some of the information with the timestamp of the corresponding item in the data store can compare the timestamp 410 of a record for the first node 250 (e.g., the first vehicle 210) in the neighbor table 510 of the beacon message 500 with the timestamp 410 of the record 414 for the first node 250 in the neighbor table 400. In response to the result of the comparison between the timestamp 410 of the record for the first node 250 in the neighbor table 510 of the beacon message 500 with the timestamp 410 of the record 414 for the first node 250 in the neighbor table 400 being that the timestamp 410 of the record for the first node 250 in the neighbor table 510 of the beacon message 500 is associated with a later time than the timestamp 410 of the record 414 for the first node 250 in the neighbor table 400, the instructions to update the corresponding item in the data store can update the record 414 for the first node 250 in the neighbor table 400 to be replaced by the record for the first node 250 in the neighbor table 510 of the beacon message 500.

Returning to FIG. 3, for example, a frequency of the specific node can be within a specific sub-band of the channel. The memory 304 can further store the sub-band reconsideration module 332. The sub-band reconsideration module 332 can include instructions that function to control the processor 302 to determine, based on the item in the at least some of the information, if the frequency of the specific node needs to be changed to be within a sub-band, of the channel, different from the specific sub-band.

With reference to FIGS. 1, 2, 4, and 5, for example, the frequency of the third node 254 can be within the second sub-band 114 of the channel 108. The instructions to determine, based on the item in the at least some of the information, if the frequency of the specific node needs to be changed to be within a sub-band, of the channel, different from the specific sub-band can determine, based on the record for the first node 250 in the neighbor table 510 of the beacon message 500 including information that the frequency 406 of the first node 250 (e.g., the first vehicle 210) is associated with the second sub-band 114, that the frequency of the third node 254 (e.g., the third vehicle 214) needs to be changed to be within a sub-band, of the channel 108, different from the second sub-band 114.

In a configuration, with reference to FIGS. 1 and 2, for example, a duration of each of the cycles 102 can be a function of a count of nodes in the set 258 of nodes. For example, the duration of each of the cycles 102 can be equal to 24 time slots and the count of nodes in the set 258 can be three: the first node 250 (e.g., the first vehicle 210), the second node 252 (e.g., the second vehicle 212), and the third node 254 (e.g., the third vehicle 214). For example, the duration of each of the cycles 102 (e.g., 24 time slots) can determine one or more of: (1) a duty cycle of each of the transmission-designated intervals 116 and 122 (e.g., 8 time slots) or (2) a number of available time slots (e.g., 16 time slots). For example, changing the duration of each of the cycles 102 can directly affect throughput through the network 260 because changing the duration of each of the cycles 102 can allow one or more of: (1) the duty cycle of each of the transmission-designated intervals 116 and 122 to be changed or (2) the number of available time slots to be changed. For example, the duration of each of the cycles 102 can be increased one or more of: (1) when the number of available time slots is limited or (2) to accommodate an additional node in the set 258 (e.g., the fourth node 256 (e.g., the fourth vehicle 216) joins the set 258). Conversely, for example, the duration of each of the cycles 102 can be decreased one or more of: (1) when the count of nodes in the set 258 is small or (2) to avoid a large number of empty time slots so that throughput through the network 260 can be improved.

Additionally, for example, in response to a determination to produce a transmission during a non-transmission-designated interval (e.g., any of the non-transmission-designated intervals 118, 120, 124, or 126), a duration of such a transmission can be a function of one or more of: (1) the count of nodes in the set 258 or (2) the degree of the transmission traffic in the network 260.

In a configuration, the instructions to schedule can include instructions to schedule, based on a probabilistic parameter, the specific node to produce the transmission. With reference to FIGS. 1 and 2, for example, the probabilistic parameter can be a function of one or more of: (1) a count of nodes in the set 258 of nodes or (2) a degree of a transmission traffic in the network 260. For example, the probabilistic parameter can provide a tradeoff between throughput through the network 260 and an avoidance of collisions of transmissions and/or interference among transmissions. For example, the probabilistic parameter can be binary in which: (1) a value of zero can cause a transmission not to be scheduled and (2) a value of one can cause the transmission to be scheduled.

Figure 6A:
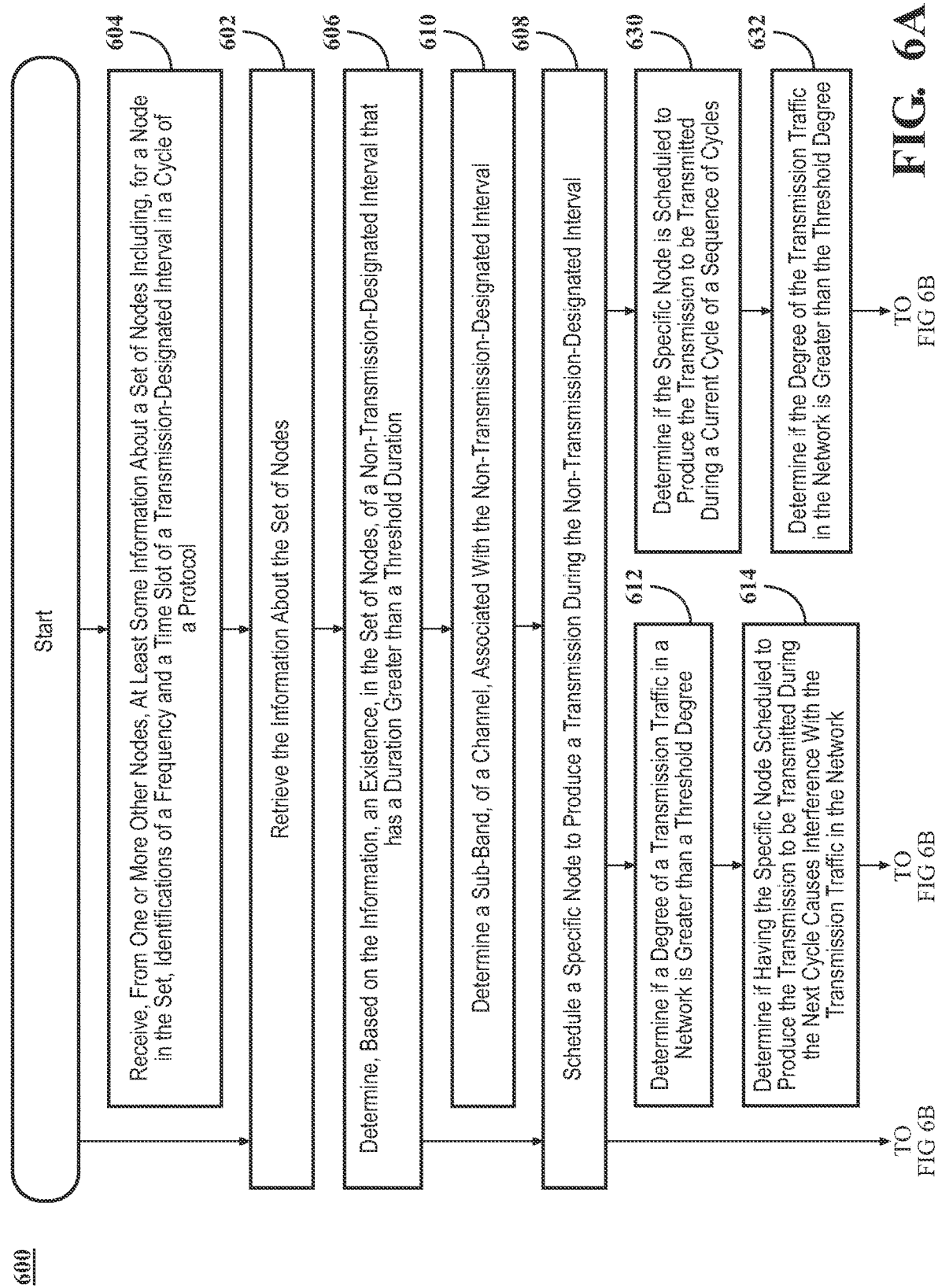
Figure 6C:
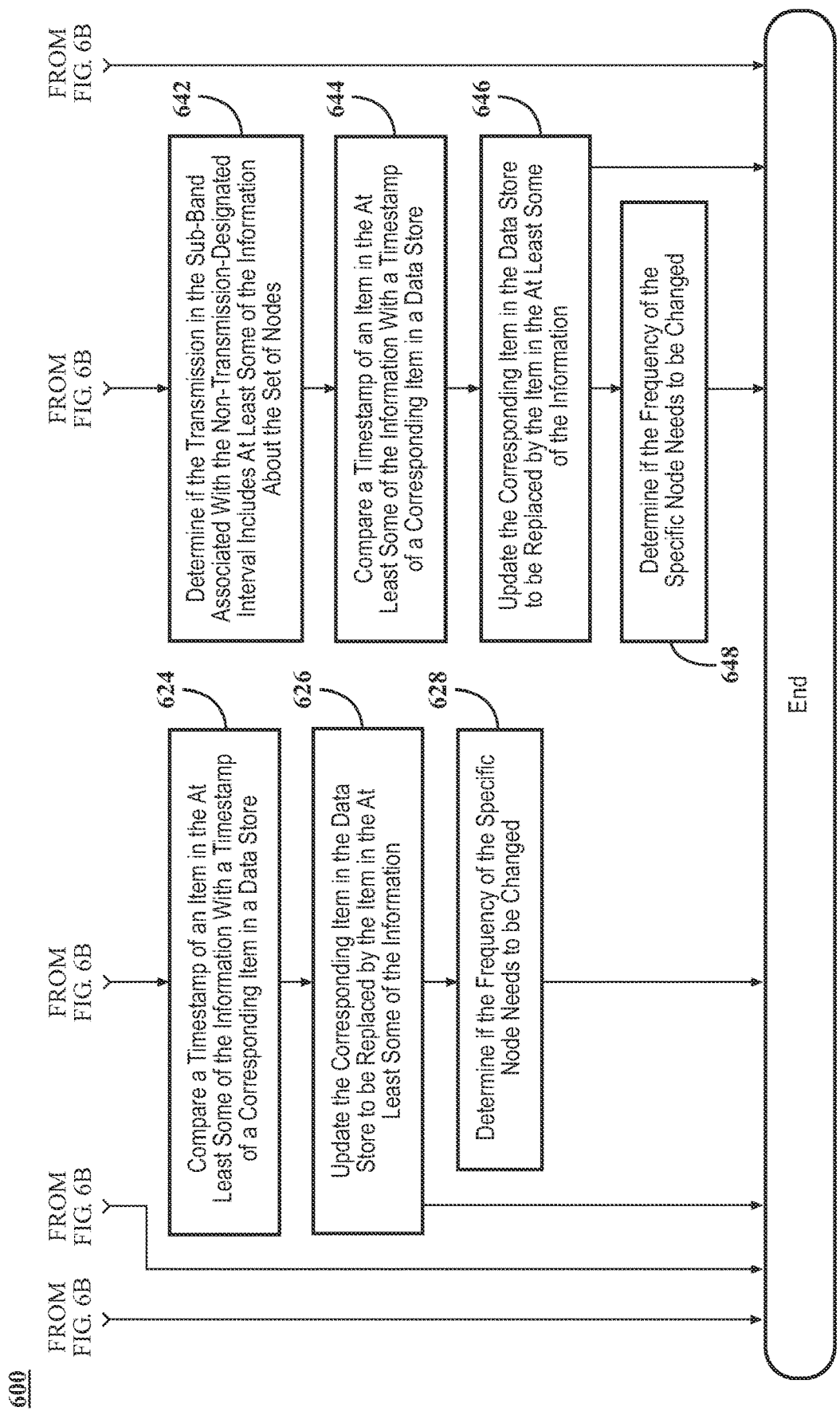

FIGS. 6A-6C are a flow diagram that illustrates an example of a method 600 that is associated with exploiting a non-transmission-designated interval in a cycle of a protocol, according to the disclosed technologies. For example, the protocol can be a medium access protocol. The method 600 is described from the perspective of the system 300 illustrated in FIG. 3. Although the method 600 is described in combination with the system 300 illustrated in FIG. 3, one of skill in the art understands, in light of the description herein, that the method 600 is not limited to being implemented by the system 300 illustrated in FIG. 3. Rather, the system 300 illustrated in FIG. 3 is an example of a system that may be used to implement the method 600. Additionally, although the method 600 is illustrated as a generally serial process, various aspects of the method 600 may be able to be executed in parallel.

In FIG. 6A, in the method 600, at an operation 602, for example, the retrieval module 306 can retrieve, by a specific node associated with a set of nodes in a network, information about the set of nodes. For example, the specific node can be disposed on a vehicle. The information can include, for a node in the set, identifications of a frequency and a time slot of a transmission-designated interval in a cycle of the protocol. For example, the retrieval module 306 can retrieve, from a data store, the information. For example, the information can be stored in an arrangement that can be referred to as a "neighbor table".

Additionally, at an operation 604, for example, the system 300 can receive, via a transceiver and from one or more other nodes in the set, at least some of the information. For example, a transmission that includes such information can be referred to as a "beacon message".

For example, the specific node can be an element of the set of nodes.

Alternatively, for example, the specific node can be a candidate to join the set of nodes.

At an operation 606, for example, the alternative transmission determination module 308 can determine, based on the information, an existence, in the set of nodes, of a non-transmission-designated interval that has a duration greater than a threshold duration.

In a configuration: (1) the network can be associated with a channel and (2) the channel can be used for both a communications operation and a radar operation. Additionally, for example, the threshold duration can allow the transmission to have a sufficient amount of energy for the radar operation.

At an operation 608, for example, the schedule module 310 can schedule, in response to the existence of a non-transmission-designated interval that has a duration greater than the threshold duration, the specific node to produce a transmission during the non-transmission-designated interval.

For example, the network can be associated with a channel. A frequency of the specific node can be within a sub-band of the channel. The non-transmission-designated interval of the specific node can be within the sub-band.

Alternatively, for example, the network can be associated with a channel. A frequency of the specific node can be within a first sub-band of the channel. The non-transmission-designated interval of the specific node can be within a second sub-band of the channel.

In a configuration, the non-transmission-designated interval can occur, in the cycle, before the transmission-designated interval (e.g., a "wait" interval).

For example, the network can be associated with a channel. A frequency of the specific node can be within a specific sub-band of the channel.

Additionally, in this configuration, at an operation 610, for example, the sub-band determination module 316 can determine, in response to the existence of a non-transmission-designated interval that has a duration greater than the threshold duration, a sub-band, of the channel, associated with the non-transmission-designated interval.

In this configuration, at the operation 608, the schedule module 310 can schedule: (1) in response to the sub-band associated with the non-transmission-designated interval being the specific sub-band, the specific node to produce the transmission to be transmitted during a current cycle of a sequence of cycles or (2) in response to the sub-band associated with the non-transmission-designated interval being different from the specific sub-band, the specific node to produce the transmission to be transmitted during a next cycle of the sequence of cycles.

Additionally, in this configuration, at an operation 612, for example, the transmission traffic determination module 318 can determine, in response to the sub-band associated with the non-transmission-designated interval being different from the specific sub-band, if a degree of a transmission traffic in the network is greater than a threshold degree.

In this configuration, at an operation 614, for example, the interference determination module 320 can determine, in response to a determination that the degree of the transmission traffic in the network is greater than the threshold degree, if having the specific node scheduled to produce the transmission to be transmitted during the next cycle causes interference with the transmission traffic in the network.

In this configuration, in FIG. 6B, in the method 600, at an operation 616, for example, the alternative transmission cancelation module 322 can cancel, in response to a determination that having the specific node scheduled to produce the transmission to be transmitted during the next cycle causes interference with the transmission traffic in the network, communication of the transmission to be transmitted during the next cycle.

In this configuration, at an operation 618, for example, the alternative transmission delay module 324 can delay, in response to a determination that having the specific node scheduled to produce the transmission to be transmitted during the next cycle does not cause interference with the transmission traffic in the network, communication of the transmission to allow for reception of a transmission in the sub-band associated with the non-transmission-designated interval.

Additionally, in this configuration, at an operation 620, for example, the system 300 can receive, via a transceiver, the transmission in the sub-band associated with the non-transmission-designated interval.

In this configuration, at an operation 622, for example, the beacon determination module 326 can determine if the transmission in the sub-band associated with the non-transmission-designated interval includes at least some of the information about the set of nodes.

In this configuration, in FIG. 6C, in the method 600, at an operation 624, for example, the comparison module 328 can compare, in response to a determination that the transmission in the sub-band associated with the non-transmission-designated interval does include the at least some of the information, a timestamp of an item in the at least some of the information with a timestamp of a corresponding item in a data store.

In this configuration, at an operation 626, for example, the information update module 330 can update, in response to a result of a comparison between the timestamp of the item in the at least some of the information and the timestamp of the corresponding item in the data store being that the timestamp of the item in the at least some of the information is associated with a later time than the timestamp of the corresponding item in the data store, the corresponding item in the data store to be replaced by the item in the at least some of the information.

Additionally, in this configuration, at an operation 628, for example, the sub-band reconsideration module 332 can determine, based on the item in the at least some of the information, if the frequency of the specific node needs to be changed to be within a sub-band, of the channel, different from the specific sub-band.

In a configuration, non-transmission-designated interval can occur, in the cycle, after the transmission-designated interval (e.g., an "idle" interval).

For example, the network can be associated with a channel.

Additionally, in FIG. 6A, in the method 600, in this configuration, at an operation 630, for example, the alternative transmission timing module 334 can determine if the specific node is scheduled to produce the transmission to be transmitted during a current cycle of a sequence of cycles.

In this configuration, at an operation 632, for example, the transmission traffic determination module 318 can determine, in response to a determination that the specific node is not scheduled to produce the transmission to be transmitted during the current cycle, if a degree of a transmission traffic in the network is greater than a threshold degree.

In this configuration, in FIG. 6B, in the method 600, at an operation 634, for example, the interference determination module can determine, in response to a determination that the degree of the transmission traffic in the network is greater than the threshold degree, if having the specific node scheduled to produce the transmission to be transmitted during a next cycle, of the sequence of cycles, causes interference with the transmission traffic in the network.

In this configuration, at an operation 636, for example, the alternative transmission cancelation module 322 can cancel, in response to a determination that having the specific node scheduled to produce the transmission to be transmitted during the next cycle causes interference with the transmission traffic in the network, communication of the transmission to be transmitted during the next cycle.

In this configuration, at an operation 638, for example, the alternative transmission delay module 324 can delay, in response to a determination that having the specific node scheduled to produce the transmission to be transmitted during the next cycle does not cause interference with the transmission traffic in the network, communication of the transmission to allow for reception of a transmission in the sub-band associated with the non-transmission-designated interval.

Additionally, in this configuration, at an operation 640, for example, the system 300 can receive, via a transceiver, the transmission in the sub-band associated with the non-transmission-designated interval.

In this configuration, in FIG. 6C, in the method 600, at an operation 642, for example, the beacon determination module 326 can determine if the transmission in the sub-band associated with the non-transmission-designated interval includes at least some of the information about the set of nodes.

In this configuration, at an operation 644, for example, the comparison module 328 can compare, in response to a determination that the transmission in the sub-band associated with the non-transmission-designated interval does include the at least some of the information, a timestamp of an item in the at least some of the information with a timestamp of a corresponding item in a data store.

In this configuration, at an operation 646, for example, the information update module 330 can update, in response to a result of a comparison between the timestamp of the item in the at least some of the information and the timestamp of the corresponding item in the data store being that the timestamp of the item in the at least some of the information is associated with a later time than the timestamp of the corresponding item in the data store, the corresponding item in the data store to be replaced by the item in the at least some of the information.

Additionally, in this configuration, for example, a frequency of the specific node can be within a specific sub-band of the channel.

In this configuration, at an operation 648, for example, the sub-band reconsideration module 332 can determine, based on the item in the at least some of the information, if the frequency of the specific node needs to be changed to be within a sub-band, of the channel, different from the specific sub-band.

In a configuration, for example, a duration of the cycle can be a function of a count of nodes in the set. For example, the duration of each of the cycles can determine one or more of: (1) a duty cycle of each of the transmission-designated intervals or (2) a number of available time slots. For example, changing the duration of each of the cycles can directly affect throughput through the network because changing the duration of each of the cycles can allow one or more of: (1) the duty cycle of each of the transmission-designated intervals to be changed or (2) the number of available time slots to be changed. For example, the duration of each of the cycles can be increased one or more of: (1) when the number of available time slots is limited or (2) to accommodate an additional node in the set. Conversely, for example, the duration of each of the cycles can be decreased one or more of: (1) when the count of nodes in the set is small or (2) to avoid a large number of empty time slots so that throughput through the network can be improved.

Additionally, for example, in response to a determination to produce a transmission during a non-transmission-designated interval, a duration of such a transmission can be a function of one or more of: (1) the count of nodes in the set or (2) a degree of a transmission traffic in the network.

In a configuration, for example, at the operation 608, the schedule module 310 can schedule, based on a probabilistic parameter, the specific node to produce the transmission. For example, the probabilistic parameter can be a function of one or more of: (1) a count of nodes in the set or (2) a degree of a transmission traffic in the network. For example, the probabilistic parameter can provide a tradeoff between throughput through the network and an avoidance of collisions of transmissions and/or interference among transmissions. For example, the probabilistic parameter can be binary in which: (1) a value of zero can cause a transmission not to be schedule and (2) a value of one can cause the transmission to be schedule.

Figure 7:
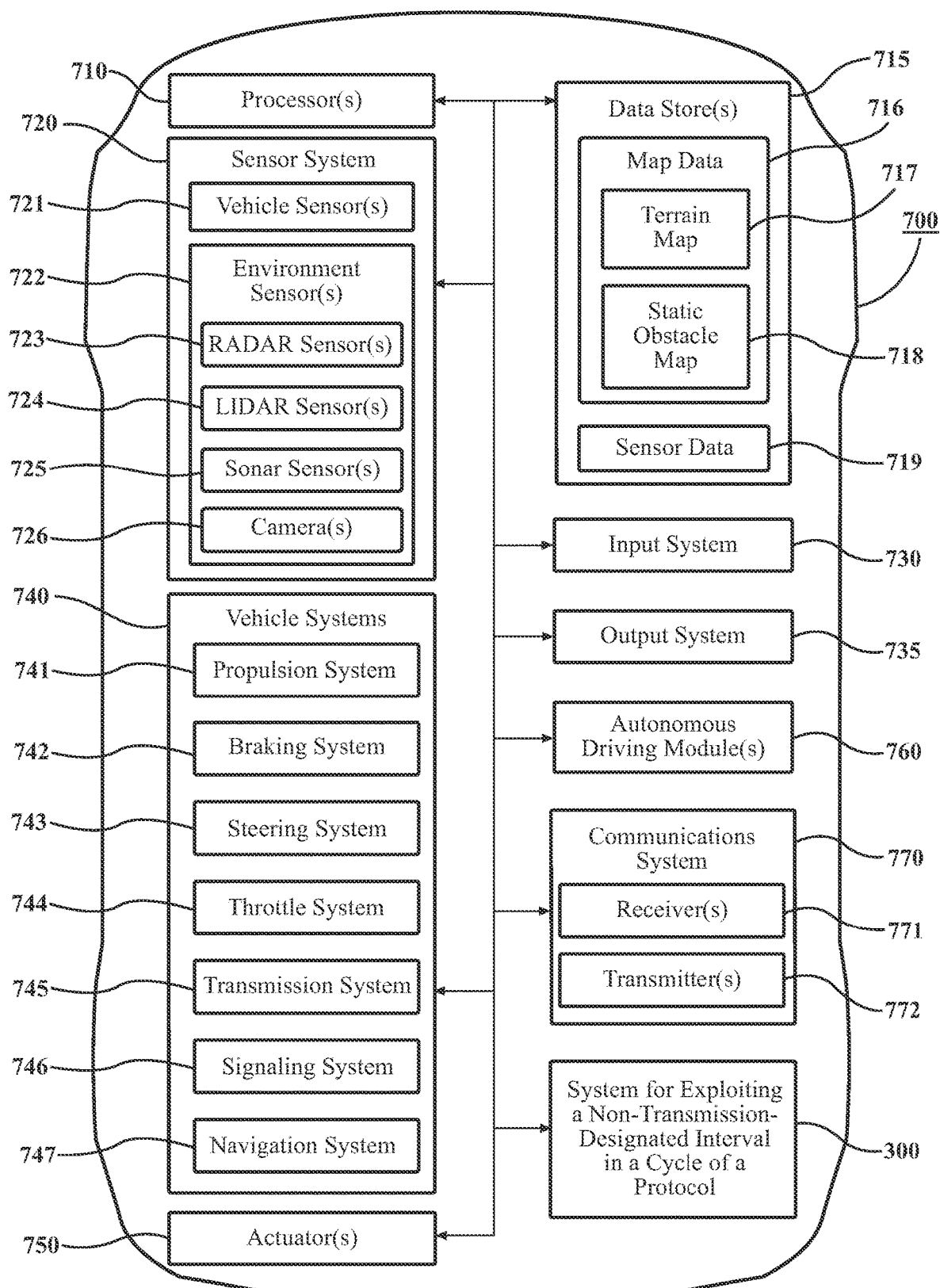
FIG. 7 includes a block diagram that illustrates an example of elements disposed on a vehicle, according to the disclosed technologies.

FIG. 7 includes a block diagram that illustrates an example of elements disposed on a vehicle 700, according to the disclosed technologies. As used herein, a "vehicle" can be any form of powered transport. In one or more implementations, the vehicle 700 can be an automobile. While arrangements described herein are with respect to automobiles, one of skill in the art understands, in light of the description herein, that embodiments are not limited to automobiles.

In some embodiments, the vehicle 700 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 700 is performed according to inputs received from a user (e.g., human driver). In one or more arrangements, the vehicle 700 can be a conventional vehicle that is configured to operate in only a manual mode.

In one or more embodiments, the vehicle 700 can be an automated vehicle. As used herein, "automated vehicle" can refer to a vehicle that operates in an automated mode. As used herein, "automated mode" can refer to navigating and/or maneuvering the vehicle 700 along a travel route using one or more computing systems to control the vehicle 700 with minimal or no input from a human driver. In one or more embodiments, the vehicle 700 can be highly automated or completely automated. In one embodiment, the vehicle 700 can be configured with one or more semi-automated operational modes in which one or more computing systems perform a portion of the navigation and/or maneuvering of the vehicle along a travel route, and a vehicle operator (i.e., driver) provides inputs to the vehicle 700 to perform a portion of the navigation and/or maneuvering of the vehicle 700 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 700 can include various elements. The vehicle 700 can have any combination of the various elements illustrated in FIG. 7. In various embodiments, it may not be necessary for the vehicle 700 to include all of the elements illustrated in FIG. 7. Furthermore, the vehicle 700 can have elements in addition to those illustrated in FIG. 7. While the various elements are illustrated in FIG. 7 as being located within the vehicle 700, one or more of these elements can be located external to the vehicle 700. Furthermore, the elements illustrated may be physically separated by large distances. For example, as described, one or more components of the disclosed system can be implemented within the vehicle 700 while other components of the system can be implemented within a cloud-computing environment, as described below. For example, the elements can include one or more processors 710, one or more data stores 715, a sensor system 720, an input system 730, an output system 735, vehicle systems 740, one or more actuators 750, one or more automated driving modules 760, a communications system 770, and the system 200 for determining a content of a message used to coordinate interactions among vehicles.

In one or more arrangements, the one or more processors 710 can be a main processor of the vehicle 700. For example, the one or more processors 710 can be an electronic control unit (ECU). For example, functions and/or operations of the processor 302 (illustrated in FIG. 3) can be realized by the one or more processors 710.

The one or more data stores 715 can store, for example, one or more types of data. For example, functions and/or operations of the memory 304, the data store 312 (illustrated in FIG. 3), or any combination thereof can be realized by the one or more data stores 715. The one or more data stores 715 can include volatile memory and/or non-volatile memory. Examples of suitable memory for the one or more data stores 715 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 715 can be a component of the one or more processors 710. Additionally or alternatively, the one or more data stores 715 can be operatively connected to the one or more processors 710 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 715 can store map data 716. The map data 716 can include maps of one or more geographic areas. In some instances, the map data 716 can include information or data on roads, traffic control devices, road markings, structures, features, and/or landmarks in the one or more geographic areas. The map data 716 can be in any suitable form. In some instances, the map data 716 can include aerial views of an area. In some instances, the map data 716 can include ground views of an area, including 360-degree ground views. The map data 716 can include measurements, dimensions, distances, and/or information for one or more items included in the map data 716 and/or relative to other items included in the map data 716. The map data 716 can include a digital map with information about road geometry. The map data 716 can be high quality and/or highly detailed.

In one or more arrangements, the map data 716 can include one or more terrain maps 717. The one or more terrain maps 717 can include information about the ground, terrain, roads, surfaces, and/or other features of one or more geographic areas. The one or more terrain maps 717 can include elevation data of the one or more geographic areas. The map data 716 can be high quality and/or highly detailed. The one or more terrain maps 717 can define one or more ground surfaces, which can include paved roads, unpaved roads, land, and other things that define a ground surface.

In one or more arrangements, the map data 716 can include one or more static obstacle maps 718. The one or more static obstacle maps 718 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 718 can have location data, size data, dimension data, material data, and/or other data associated with them. The one or more static obstacle maps 718 can include measurements, dimensions, distances, and/or information for one or more static obstacles. The one or more static obstacle maps 718 can be high quality and/or highly detailed. The one or more static obstacle maps 718 can be updated to reflect changes within a mapped area.

In one or more arrangements, the one or more data stores 715 can store sensor data 719. As used herein, "sensor data" can refer to any information about the sensors with which the vehicle 700 can be equipped including the capabilities of and other information about such sensors. The sensor data 719 can relate to one or more sensors of the sensor system 720. For example, in one or more arrangements, the sensor data 719 can include information about one or more lidar sensors 724 of the sensor system 720.

In some arrangements, at least a portion of the map data 716 and/or the sensor data 719 can be located in one or more data stores 715 that are located onboard the vehicle 700. Alternatively or additionally, at least a portion of the map data 716 and/or the sensor data 719 can be located in one or more data stores 715 that are located remotely from the vehicle 700.

The sensor system 720 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 720 includes a plurality of sensors, the sensors can work independently from each other. Alternatively, two or more of the sensors can work in combination with each other. In such a case, the two or more sensors can form a sensor network. The sensor system 720 and/or the one or more sensors can be operatively connected to the one or more processors 710, the one or more data stores 715, and/or another element of the vehicle 700 (including any of the elements illustrated in FIG. 7). The sensor system 720 can acquire data of at least a portion of the external environment of the vehicle 700 (e.g., nearby vehicles). The sensor system 720 can include any suitable type of sensor. Various examples of different types of sensors are described herein. However, one of skill in the art understands that the embodiments are not limited to the particular sensors described herein.

The sensor system 720 can include one or more vehicle sensors 721. The one or more vehicle sensors 721 can detect, determine, and/or sense information about the vehicle 700 itself. In one or more arrangements, the one or more vehicle sensors 721 can be configured to detect and/or sense position and orientation changes of the vehicle 700 such as, for example, based on inertial acceleration. In one or more arrangements, the one or more vehicle sensors 721 can include one or more accelerometers, one or more gyroscopes, an inertial measurement unit (IMU), a dead-reckoning system, a global navigation satellite system (GNSS), a global positioning system (GPS), a navigation system 747, and/or other suitable sensors. The one or more vehicle sensors 721 can be configured to detect and/or sense one or more characteristics of the vehicle 700. In one or more arrangements, the one or more vehicle sensors 721 can include a speedometer to determine a current speed of the vehicle 700.

Alternatively or additionally, the sensor system 720 can include one or more environment sensors 722 configured to acquire and/or sense driving environment data. As used herein, "driving environment data" can include data or information about the external environment in which a vehicle is located or one or more portions thereof. For example, the one or more environment sensors 722 can be configured to detect, quantify, and/or sense obstacles in at least a portion of the external environment of the vehicle 700 and/or information/data about such obstacles. Such obstacles may be stationary objects and/or dynamic objects. The one or more environment sensors 722 can be configured to detect, measure, quantify, and/or sense other things in the external environment of the vehicle 700 such as, for example, lane markers, signs, traffic lights, traffic signs, lane lines, crosswalks, curbs proximate the vehicle 700, off-road objects, etc.

Various examples of sensors of the sensor system 720 are described herein. The example sensors may be part of the one or more vehicle sensors 721 and/or the one or more environment sensors 722. However, one of skill in the art understands that the embodiments are not limited to the particular sensors described.

In one or more arrangements, the one or more environment sensors 722 can include one or more radar sensors 723, one or more lidar sensors 724, one or more sonar sensors 725, and/or one more cameras 726. In one or more arrangements, the one or more cameras 726 can be one or more high dynamic range (HDR) cameras or one or more infrared (IR) cameras. For example, the one or more cameras 726 can be used to record a reality of a state of an item of information that can appear in the digital map. For example, functions and/or operations of the transceiver 314 (illustrated in FIG. 3) can be realized by the one or more radar sensors 723.

The input system 730 can include any device, component, system, element, arrangement, or groups thereof that enable information/data to be entered into a machine. The input system 730 can receive an input from a vehicle passenger (e.g., a driver or a passenger). The output system 735 can include any device, component, system, element, arrangement, or groups thereof that enable information/data to be presented to a vehicle passenger (e.g., a driver or a passenger).

Various examples of the one or more vehicle systems 740 are illustrated in FIG. 7. However, one of skill in the art understands that the vehicle 700 can include more, fewer, or different vehicle systems. Although particular vehicle systems can be separately defined, each or any of the systems or portions thereof may be otherwise combined or segregated via hardware and/or software within the vehicle 700. For example, the one or more vehicle systems 740 can include a propulsion system 741, a braking system 742, a steering system 743, a throttle system 744, a transmission system 745, a signaling system 746, and/or the navigation system 747. Each of these systems can include one or more devices, components, and/or a combination thereof, now known or later developed.

The navigation system 747 can include one or more devices, applications, and/or combinations thereof, now known or later developed, configured to determine the geographic location of the vehicle 700 and/or to determine a travel route for the vehicle 700. The navigation system 747 can include one or more mapping applications to determine a travel route for the vehicle 700. The navigation system 747 can include a global positioning system, a local positioning system, a geolocation system, and/or a combination thereof.

The one or more actuators 750 can be any element or combination of elements operable to modify, adjust, and/or alter one or more of the vehicle systems 740 or components thereof responsive to receiving signals or other inputs from the one or more processors 710 and/or the one or more automated driving modules 760. Any suitable actuator can be used. For example, the one or more actuators 750 can include motors, pneumatic actuators, hydraulic pistons, relays, solenoids, and/or piezoelectric actuators.

The one or more processors 710 and/or the one or more automated driving modules 760 can be operatively connected to communicate with the various vehicle systems 740 and/or individual components thereof. For example, the one or more processors 710 and/or the one or more automated driving modules 760 can be in communication to send and/or receive information from the various vehicle systems 740 to control the movement, speed, maneuvering, heading, direction, etc. of the vehicle 700. The one or more processors 710 and/or the one or more automated driving modules 760 may control some or all of these vehicle systems 740 and, thus, may be partially or fully automated.

The one or more processors 710 and/or the one or more automated driving modules 760 may be operable to control the navigation and/or maneuvering of the vehicle 700 by controlling one or more of the vehicle systems 740 and/or components thereof. For example, when operating in an automated mode, the one or more processors 710 and/or the one or more automated driving modules 760 can control the direction and/or speed of the vehicle 700. The one or more processors 710 and/or the one or more automated driving modules 760 can cause the vehicle 700 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 770 can include one or more receivers 771 and/or one or more transmitters 772. For example, functions and/or operations of the transceiver 314 (illustrated in FIG. 3) can be realized by the one or more receivers 771 and the one or more transmitters 772. The communications system 770 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 770 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

The vehicle 700 can include one or more modules, at least some of which are described herein. The modules can be implemented as computer-readable program code that, when executed by the one or more processors 710, implement one or more of the various processes described herein. One or more of the modules can be a component of the one or more processors 710. Alternatively or additionally, one or more of the modules can be executed on and/or distributed among other processing systems to which the one or more processors 710 can be operatively connected. The modules can include instructions (e.g., program logic) executable by the one or more processors 710. Alternatively or additionally, the one or more data store 715 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 700 can include one or more automated driving modules 760. The one or more automated driving modules 760 can be configured to receive data from the sensor system 720 and/or any other type of system capable of capturing information relating to the vehicle 700 and/or the external environment of the vehicle 700. In one or more arrangements, the one or more automated driving modules 760 can use such data to generate one or more driving scene models. The one or more automated driving modules 760 can determine position and velocity of the vehicle 700. The one or more automated driving modules 760 can determine the location of obstacles, obstacles, or other environmental features including traffic signs, trees, shrubs, neighboring vehicles, pedestrians, etc.

The one or more automated driving modules 760 can be configured to receive and/or determine location information for obstacles within the external environment of the vehicle 700 for use by the one or more processors 710 and/or one or more of the modules described herein to estimate position and orientation of the vehicle 700, vehicle position in global coordinates based on signals from a plurality of satellites, or any other data and/or signals that could be used to determine the current state of the vehicle 700 or determine the position of the vehicle 700 with respect to its environment for use in either creating a map or determining the position of the vehicle 700 in respect to map data.

The one or more automated driving modules 760 can be configured to determine one or more travel paths, current automated driving maneuvers for the vehicle 700, future automated driving maneuvers and/or modifications to current automated driving maneuvers based on data acquired by the sensor system 720, driving scene models, and/or data from any other suitable source such as determinations from the sensor data 719. As used herein, "driving maneuver" can refer to one or more actions that affect the movement of a vehicle. Examples of driving maneuvers include: accelerating, decelerating, braking, turning, moving in a lateral direction of the vehicle 700, changing travel lanes, merging into a travel lane, and/or reversing, just to name a few possibilities. The one or more automated driving modules 760 can be configured to implement determined driving maneuvers. The one or more automated driving modules 760 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 760 can be configured to execute various vehicle functions and/or to transmit data to, receive data from, interact with, and/or control the vehicle 700 or one or more systems thereof (e.g., one or more of vehicle systems 740). For example, functions and/or operations of an automotive navigation system can be realized by the one or more automated driving modules 760.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-5, 6A-6C, and 7, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing:
   a retrieval module including instructions that when executed by the processor cause the processor to retrieve, by a specific node associated with a set of nodes in a network, information about the set, the information including, for a node in the set, identifications of a frequency and a time slot of a transmission-designated interval in a cycle of a protocol;
   an alternative transmission determination module including instructions that when executed by the processor cause the processor to determine, based on the information, an existence, in the set, of a non-transmission-designated interval that has a duration greater than a threshold duration; and
   a schedule module including instructions that when executed by the processor cause the processor to schedule, in response to the existence, the specific node to produce a transmission during the non-transmission-designated interval.

2. The system of claim 1, wherein:
the network is associated with a channel, the channel is used for both a communications operation and a radar operation, and
the threshold duration allows the transmission to have a sufficient amount of energy for the radar operation.

3. The system of claim 1:
further comprising:
a data store configured to store the information; and
a transceiver configured to receive, from at least one other node in the set, at least some of the information,
wherein the instructions to retrieve include instructions to retrieve, from the data store, the information.

4. The system of claim 1, wherein the non-transmission-designated interval occurs, in the cycle, before the transmission-designated interval.

5. The system of claim 4, wherein:
the network is associated with a channel,
a frequency of the specific node is within a specific sub-band of the channel,
the memory further stores a sub-band determination module including instructions that when executed by the processor cause the processor to determine, in response to the existence, a sub-band, of the channel, associated with the non-transmission-designated interval,
the instructions to schedule include instructions to schedule, in response to the sub-band associated with the non-transmission-designated interval being the specific sub-band, the specific node to produce the transmission to be transmitted during a current cycle of a sequence of cycles, and
the instructions to schedule include instructions to schedule, in response to the sub-band associated with the non-transmission-designated interval being different from the specific sub-band, the specific node to produce the transmission to be transmitted during a next cycle of the sequence of cycles.

6. The system of claim 5, wherein the memory further stores:
a transmission traffic determination module including instructions that when executed by the processor cause the processor to determine, in response to the sub-band associated with the non-transmission-designated interval being different from the specific sub-band, if a degree of a transmission traffic in the network is greater than a threshold degree;
an interference determination module including instructions that when executed by the processor cause the processor to determine, in response to a determination that the degree of the transmission traffic in the network is greater than the threshold degree, if having the specific node scheduled to produce the transmission to be transmitted during the next cycle causes interference with the transmission traffic in the network;
an alternative transmission cancelation module including instructions that when executed by the processor cause the processor to cancel, in response to a determination that having the specific node scheduled to produce the transmission to be transmitted during the next cycle causes interference with the transmission traffic in the network, communication of the transmission to be transmitted during the next cycle; and
an alternative transmission delay module including instructions that when executed by the processor cause the processor to delay, in response to a determination that having the specific node scheduled to produce the transmission to be transmitted during the next cycle does not cause interference with the transmission traffic in the network, communication of the transmission to allow for reception of a transmission in the sub-band associated with the non-transmission-designated interval.

7. The system of claim 6:
further comprising:
a transceiver configured to receive the transmission in the sub-band associated with the non-transmission-designated interval; and
a data store configured to store the information,
wherein the memory further stores:
a beacon determination module including instructions that when executed by the processor cause the processor to determine if the transmission in the sub-band associated with the non-transmission-designated interval includes at least some of the information about the set of nodes;
a comparison module including instructions that when executed by the processor cause the processor to compare, in response to a determination that the transmission in the sub-band associated with the non-transmission-designated interval does include the at least some of the information, a timestamp of an item in the at least some of the information with a timestamp of a corresponding item in the data store; and
an information update module including instructions that when executed by the processor cause the processor to update, in response to a result of a comparison between the timestamp of the item in the at least some of the information and the timestamp of the corresponding item in the data store being that the timestamp of the item in the at least some of the information is associated with a later time than the timestamp of the corresponding item in the data store, the corresponding item in the data store to be replaced by the item in the at least some of the information.

8. The system of claim 7, wherein the memory further stores a sub-band reconsideration module including instructions that when executed by the processor cause the processor to determine, based on the item in the at least some of the information, if the frequency of the specific node needs to be changed to be within a sub-band, of the channel, different from the specific sub-band.

9. The system of claim 1, wherein the non-transmission-designated interval occurs, in the cycle, after the transmission-designated interval.

10. The system of claim 9, wherein:
the network is associated with a channel, and
the memory further stores:
an alternative transmission timing module including instructions that when executed by the processor cause the processor to determine if the specific node is scheduled to produce the transmission to be transmitted during a current cycle of a sequence of cycles;
a transmission traffic determination module including instructions that when executed by the processor cause the processor to determine, in response to a determination that the specific node is not scheduled to produce the transmission to be transmitted during the current cycle, if a degree of a transmission traffic in the network is greater than a threshold degree;
an interference determination module including instructions that when executed by the processor cause the processor to determine, in response to a determination that the degree of the transmission traffic in the network is greater than the threshold degree, if having the specific node scheduled to produce the transmission to be transmitted during a next cycle, of the sequence of cycles, causes interference with the transmission traffic in the network;

an alternative transmission cancelation module including instructions that when executed by the processor cause the processor to cancel, in response to a determination that having the specific node scheduled to produce the transmission to be transmitted during the next cycle causes interference with the transmission traffic in the network, communication of the transmission to be transmitted during the next cycle; and an alternative transmission delay module including instructions that when executed by the processor cause the processor to delay, in response to a determination that having the specific node scheduled to produce the transmission to be transmitted during the next cycle does not cause interference with the transmission traffic in the network, communication of the transmission to allow for reception of a transmission in a sub-band, of the channel, associated with the non-transmission-designated interval.

11. The system of claim 10:
further comprising:
a transceiver configured to receive the transmission in the sub-band associated with the non-transmission-designated interval; and
a data store configured to store the information,
wherein the memory further stores:
a beacon determination module including instructions that when executed by the processor cause the processor to determine if the transmission in the sub-band associated with the non-transmission-designated interval includes at least some of the information about the set of nodes;
a comparison module including instructions that when executed by the processor cause the processor to compare, in response to a determination that the transmission in the sub-band associated with the non-transmission-designated interval does include the at least some of the information, a timestamp of an item in the at least some of the information with a timestamp of a corresponding item in a data store; and
an information update module including instructions that when executed by the processor cause the processor to update, in response to a result of a comparison between the timestamp of the item in the at least some of the information and the timestamp of the corresponding item in the data store being that the timestamp of the item in the at least some of the information is associated with a later time than the timestamp of the corresponding item in the data store, the corresponding item in the data store to be replaced by the item in the at least some of the information.

12. The system of claim 11, wherein:
a frequency of the specific node is within a specific sub-band of the channel, and
the memory further stores a sub-band reconsideration module including instructions that when executed by the processor cause the processor to determine, based on the item in the at least some of the information, if the frequency of the specific node needs to be changed to be within a sub-band, of the channel, different from the specific sub-band.

13. The system of claim 1, wherein an endpoint of the cycle is designated by at least one of:
a synchronization signal produced by a global navigation satellite system,
a synchronization signal produce by a synchronization control node in the network, or
a pattern in the cycle agreed-upon by otherwise synchronized nodes in the network.

14. The system of claim 1, wherein a duration of the cycle is a function of a count of nodes in the set.

15. The system of claim 1, wherein:
the instructions to schedule include instructions to schedule, based on a probabilistic parameter, the specific node to produce the transmission, and
the probabilistic parameter is a function of at least one of a count of nodes in the set or a degree of a transmission traffic in the network.

16. A method, comprising:
retrieving, by a processor of a specific node associated with a set of nodes in a network, information about the set, the information including, for a node in the set, identifications of a frequency and a time slot of a transmission-designated interval in a cycle of a protocol;
determining, by the processor and based on the information, an existence, in the set, of a non-transmission-designated interval that has a duration greater than a threshold duration; and
scheduling, by the processor and in response to the existence, the specific node to produce a transmission during the non-transmission-designated interval.

17. The method of claim 16, wherein the specific node is a candidate to join the set.

18. The method of claim 16, wherein:
the network is associated with a channel,
a frequency of the specific node is within a sub-band of the channel, and
the non-transmission-designated interval of the specific node is within the sub-band.

19. The method of claim 16, wherein:
the network is associated with a channel,
a frequency of the specific node is within a first sub-band of the channel, and
the non-transmission-designated interval of the specific node is within a second sub-band of the channel.

20. A non-transitory computer-readable medium for exploiting a non-transmission-designated interval in a cycle of a protocol, the non-transitory computer-readable medium including instructions that when executed by one or more processors cause the one or more processors to:
retrieve, by a specific node associated with a set of nodes in a network, information about the set, the information including, for a node in the set, identifications of a frequency and a time slot of a transmission-designated interval in the cycle of the protocol;
determine, based on the information, an existence, in the set, of a non-transmission-designated interval that has a duration greater than a threshold duration; and
schedule, in response to the existence, the specific node to produce a transmission during the non-transmission-designated interval.

* * * * *